United States Patent [19]

Shirai

[11] 4,301,906
[45] Nov. 24, 1981

[54] ELECTROMAGNETIC CLUTCHES

[75] Inventor: Isamu Shirai, Isesaki, Japan

[73] Assignee: Sankyo Electric Company Limited, Isesaki, Japan

[21] Appl. No.: 720

[22] Filed: Jan. 3, 1979

[30] Foreign Application Priority Data

Jan. 10, 1978 [JP] Japan .................................. 53-1262[U]
May 16, 1978 [JP] Japan .............................. 53-64531[U]

[51] Int. Cl.³ ............................................. F16D 27/10
[52] U.S. Cl. .................................................... 192/84 C
[58] Field of Search .................. 192/84 C, 84 A, 84 B

[56] References Cited

U.S. PATENT DOCUMENTS

| | | | |
|---|---|---|---|
| 647,436 | 4/1900 | Beck | 192/84 B |
| 1,622,261 | 3/1927 | Payne | 192/84 A |
| 2,857,998 | 10/1958 | Harter | 192/84 C |
| 3,455,421 | 7/1969 | Miller | 192/84 C |
| 3,842,378 | 10/1974 | Pierce | 192/84 A X |
| 3,876,048 | 4/1975 | Briar | 192/84 C |
| 4,122,930 | 10/1978 | Bennett et al. | 192/84 C |
| 4,160,498 | 7/1979 | Newton et al. | 192/84 C |
| 4,227,600 | 10/1980 | Shirai | 192/84 C |

Primary Examiner—Rodney H. Bonck
Attorney, Agent, or Firm—Hopgood, Calimafde, Kalil, Blaustein & Judlowe

[57] ABSTRACT

An electromagnetic clutch for selectively transmitting the rotation of a magnetic pulley to a rotatable shaft by the magnetic attraction of an annular magnetic armature plate elastically supported on the shaft to an axial end of the pulley produced by the energization of an electromagnet stationarily disposed in a radial hollow portion of the pulley. A radial inner wall defining the hollow portion of the pulley is partially thicker in the radial thickness at an axial extent between the axial end of the pulley and the electromagnet, thereby to decrease the magnetic resistance through the axial extent and to strengthen the magnetic attraction force between the pulley and the armature without increasing the outer diameter of the clutch. A magnetic ring may be partially fitted to the inner wall to substantially increase the radial thickness in place of the partial increase of the radial thickness of the inner wall itself.

3 Claims, 6 Drawing Figures

ELECTROMAGNETIC CLUTCHES

BACKGROUND OF THE INVENTION

This invention relates generally to electromagnetic clutches and, in particular, to such clutches which are used to control the transmission of an automobile engine to a refrigerant compressor of an automobile air-conditioning refrigerating system.

FIG. 1 illustrates a known electromagnetic clutch which is provided between an automobile engine and a compressor to selectively drive the compressor. That clutch, as shown, comprises a pulley 1 mounted on a bearing 2 which, in turn, is mounted on a tubular extension 3 of a compressor housing 4 and is rotated by a belt 5 from the automobile engine (not shown), as disclosed, for example, in U.S. Pat. Nos. 3,044,594 and 3,082,933.

The pulley 1 is made of a magnetic material, for example, steel and comprises an outer annular cylindrical portion 1a having V-shaped grooves 6 in an outer surface thereof, an inner annular cylindrical portion 1b mounted on the bearing 2, and an axial end plate portion 1c connecting between the outer and inner annular cylindrical portions at an axial end thereof to form an annular hollow portion 7 therebetween. The axial end plate portion 1c is provided with a plurality of concentric slits 8 to form a plurality of concentric annular magnetic pole faces at an axial end thereof.

An annular electromagnetic 9 is stationarily disposed in the hollow portion 7 and is secured to the compressor housing 4 by means of bolts. The electromagnet 9 comprises an annular magnetic housing 9a having a U-shaped section and an annular electromagnetic coil 9b contained therein.

A drive shaft 10 is rotatably supported in a bearing 11 mounted in the tubular extension 3. A hub member or an annular radial flange 12 is secured on a projected end of the drive shaft 10. A magnetic armature plate 13 is supported by leaf springs 14 on and around the hub member 12 with a radial gap 15 therebetween so as to be capable of limited axial movement and to face the axial end plate portion 1c with an axial gap 16 therebetween.

A shaft seal 17 is provided around the drive shaft 10 in the tubular extension 3.

When the magnetic coil 9b is energized, magnetic flux flows through a closed loop comprising the magnetic housing 9a, the outer annular cylindrical portion 1a, the armature plate 13, the axial end plate portion 1c, the armature plate 13, and the inner annular cylindrical portion 1b, as shown by the broken line φ. Thus, the armature plate 13 is attracted to the axial end plate portion 1c, so that the drive shaft 10 is rotated together with the pulley 1 by the engine output. When the magnetic coil 9b is not energized, the pulley 1 is rotated by the engine, but the compressor is not driven.

In the above described clutch, the transmission of the rotating force from the pulley to the drive shaft is effected by the friction at the contacting surface between the pulley 1 and the armature plate 13. Therefore, the magnetic attraction force between the pulley and the armature plate is required to be quite large. Since the magnetic attraction force is related to the magnetic flux flowing through the closed loop, it is advantageous for the magnetic resistance of the closed loop to be relatively low.

As shown in FIG. 2, since the diameter of the inner annular cylindrical portion 1b is smaller than that of the outer annular cylindrical porton 1a, the sectional area of the inner annular cylindrical portion 1b is generally smaller than that of the outer annular cylindrical portion 1a. Therefore, the magnetic flux is restricted by the sectional area of the inner annular cylindrical portion 1b, especially at the axial extent (A in FIG. 3) between the magnetic housing 9a and the axial end plate portion 1c, because the magnetic housing 9a and an outer ring of the bearing 2 exist in parallel with the other axial extent of the inner annular cylindrical portion 1b than the axial extent A thereof to increase the sectional area of the magnetic path, as shown in FIG. 3.

The increase of the radial thickness of the inner annular cylindrical portion 1b increases the sectional area of the inner annular cylindrical portion 1b but also increases the dimension and the weight of the clutch.

In the known electromagnetic clutch, if lubricating oil leaks out through the shaft seal 17, the leaked oil may flow into the axial gap 16 between the axial end plate portion 1c and the armature plate 13. This results in the reduction of the friction between the axial end plate portion 1c and the armature plate 13.

SUMMARY OF THE INVENTION

An object of this invention is to provide an electromagnetic clutch wherein a large magnetic attraction force between a first rotatable member and an armature plate supported on a second rotatable member is obtained with a simple and compact structure.

Another object of this invention is to provide an electromagnetic clutch wherein leaked oil is prevented from flowing into the axial gap between the first rotatable member and the armature plate.

To these ends, the electromagnetic clutch of the present invention includes a first rotatable member comprising an outer annular cylindrical portion, an inner annular cylindrical portion mounted on a bearing member, and an axial end plate portion connecting between both cylindrical portions at an axial end thereof thereby to form an annular hollow portion therebetween. An electromagnetic comprising an annular magnetic housing and a coil member contained therein is stationarily disposed in the hollow portion. A second rotatable member has an armature plate which faces the axial end plate portion with an axial gap therebetween. The armature plate is magnetically attracted to the axial end plate portion at a time when the coil is energized, so that the rotating force of the first rotatable member is transmitted to the second rotatable member.

The radial thickness of the inner annular cylindrical portion of the first rotatable member is made partially thicker at an axial extent between the axial end plate portion and the electromagnetic than the other part thereof. In this manner the magnetic resistance at the inner annular cylindrical portion is lowered without increasing the outer diameter of the clutch so that a large magnetic attraction force between the axial end plate portion and the armature plate is obtained.

In another aspect of this invention, the magnetic housing is partially cut away in a radially inner surface thereof adjacent the axial end plate portion to form an annular recess in the surface. The inner annular cylindrical portion is provided with an annular shoulder radially outwardly raised thereon at an axial extent from a part corresponding to the recess to the axial end plate portion, whereby the inner cylindrical portion is partially thicker at the axial extent than the other part thereof. In place of the shoulder, a magnetic ring may be fixedly fitted onto the inner annular cylindrical portion. A magnetic ring may be additionally fixedly fitted onto the shoulder of the inner annular cylindrical portion.

In yet another aspect of this invention, the inner annular cylindrical portion is provided with a bore part of a smaller diameter than the other part adjacent the axial end plate portion, whereby the inner annular cylindrical portion is partially thicker at a part adjacent the axial end plate portion than the other part thereof. Alternatively, a magnetic ring may be fixedly fitted into the inner annular cylindrical portion in an axial end adjacent the axial end plate portion, whereby the inner annular cylindrical portion is partially substantially thicker at the axial end thereof than the other portion thereof.

The bore part of the smaller diameter of the magnetic ring fitted into the inner annular cylindrical portion may be provided with an annular flange axially outwardly extending from the axial end thereof. The extended end of the flange is disposed in the radial gap between the magnetic armature plafte and a hub maker on which the armature is supported by means of leaf springs. Thus, oil leaked is guided along the inner surface of the flange to be discharged outside through the radial gap. The inner surface of the flange may be formed in a tapered surface to diverge toward the extended end of the flange.

Further objects, features, and other aspects of this invention will be understood from the following detailed description of preferred embodiments of this invention referring to annexed drawings.

DETAILED DESCRIPTION OF PREFERRED EMBODIMENTS

Figure 1:
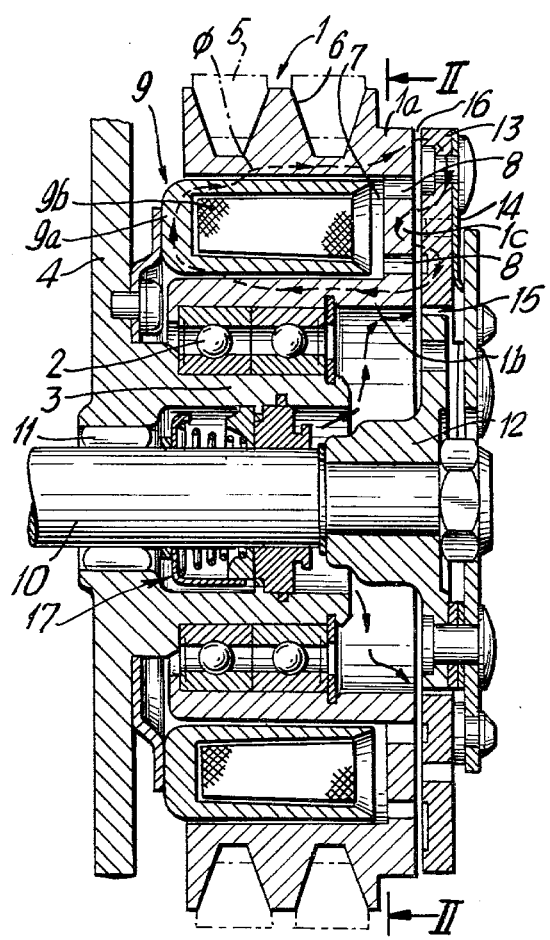
FIG. 1 is a cross-sectional view of a known electromagnetic clutch.
Figure 2:
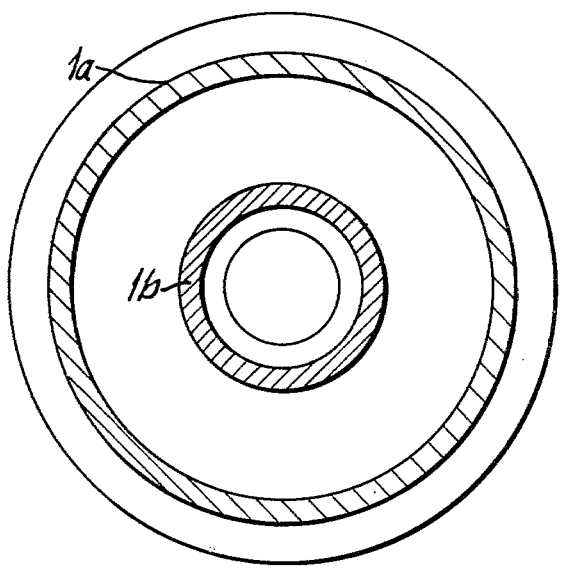
FIG. 2 is a cross-sectional view taken along a line II—II in FIG. 2.
Figure 3:
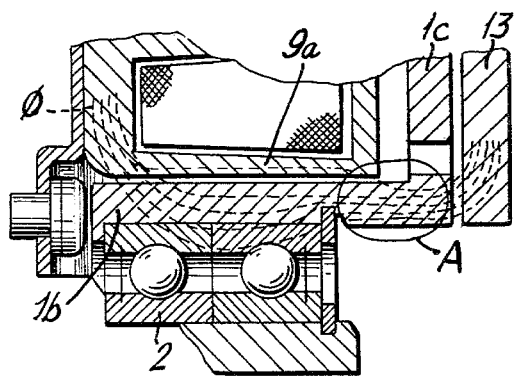
FIG. 3 is a cross-sectional view of a portion of the known electromagnetic clutch for explaining the magnetic flux flow.
Figure 4:
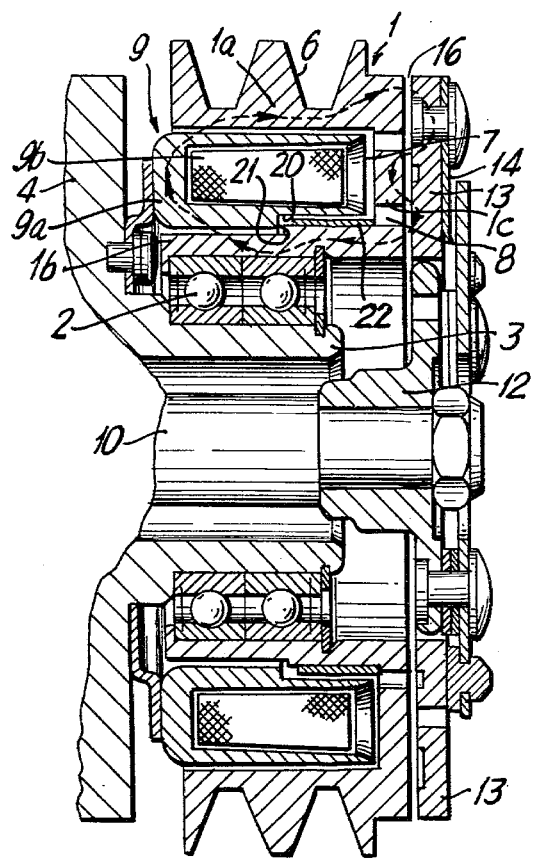
FIG. 4 is a cross-sectional view of an electromagnetic clutch according to an embodiment of this invention.

The embodiment of the invention illustrated in FIG. 4 is similar to the known electromagnetic clutch as shown in FIG. 1, except for the arrangement of the pulley and the magnetic housing of the electromagnet. Accordingly, similar parts of the clutch illustrated in FIG. 4 are designated by the same reference numerals as in FIG. 1, and the explanation of these similar parts is omitted in order to simplify of the description.

In the embodiment of FIG. 4, the radial inner wall of the magnetic housing 9a is partially cut away in the surface adjacent the inner annular cylindrical portion 1b of the pulley 1 and at a part adjacent the axial end plate piston 1c of the pulley 1 to form an annular recess 20 in the surface.

The inner annular cylindrical portion 1b is provided with an annular shoulder 21 radially outwardly raised thereon. The shoulder 21 projects into the recess 20 and, therefrom, axially extends to the axial end plate portion 1c. Thus, the inner cylindrical portion 1b is partially thicker at an axial extent than the other part thereof. A magnetic ring 22 made, for example, of steel is fixedly fitted onto the shoulder 21.

In this embodiment, the sectional area of the magnetic flux path through the inner annular cylindrical portion 1b is increased as a result of the provision of the shoulder 21 and the magnetic ring 22 at an axial extent between the inner edge of the magnetic housing 9a and the inner annular cylindrical portion 1b.

Since the partial increase of the sectional area of the inner cylindrical portion 1b is achieved by the use of the axial gap between the magnetic housing 9a and the axial end plate portion 1c and by the provision of the cut-away recess 20 to the magnetic housing 9a, there is no increase in the outer diameter of the pulley 1. Therefore, in the electromagnetic clutch of this embodiment a greater magnetic attraction force is achieved between the pulley and the armature plate, but without any increase in the volume of the clutch.

In this embodiment, a magnetic ring is shown fitted onto the shoulder. However, it is not necessary to fit the magnetic ring onto the shoulder, in which case, the shoulder may be formed higher. Alternatively, a magnetic ring of a greater radial thickness may be only fitted onto the inner annular cylindrical portion, without the provision of the shoulder at the inner annular cylindrical portion.

Figure 5:
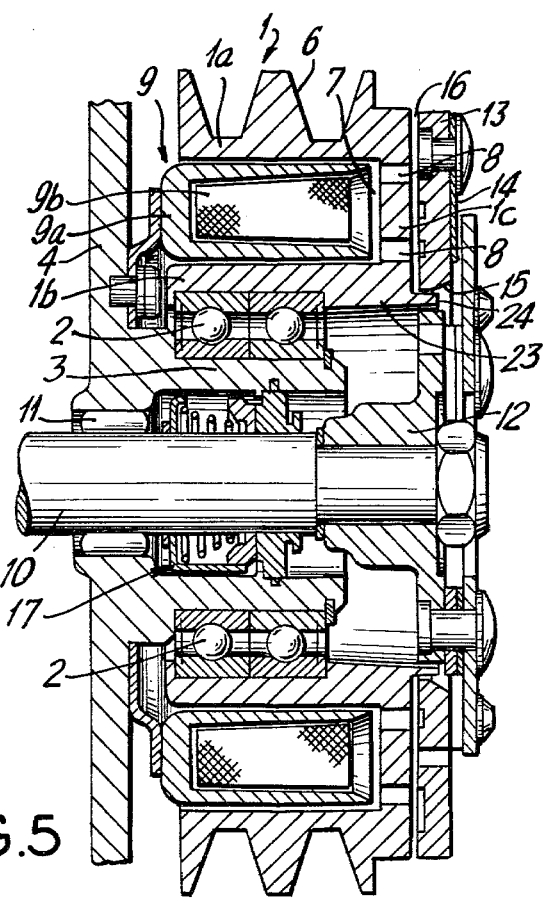
FIG. 5 is a cross-sectional view of an electromagnetic clutch according to another embodiment of this invention.

The embodiment of the invention illustrated in FIG. 5 is characterized by the inner annular cylindrical portion 1b being provided with a smaller bore part 23. The smaller bore part 23 axially extends from the axial end plate portion 1c to the bearing 2. Thus, at the axial extent, the inner annular cylindrical portion 1b is thicker in the radial thickness than the other part thereof. The axial inner edge of the smaller bore part 23 serves for an axial stopper for the outer ring of the bearing 2.

In the embodiment of FIG. 5, the smaller bore part 23 is provided with an annular flange 24 which axially outwardly extends from the radially inner and axial edge of the smaller bore part. The extended end of the annular flange 24 is disposed in the radial gap 15 between the magnetic armature plate 13 and the hub member 12. The inner surface of the smaller bore part 23 and the annular flange 24 is formed in a tapered surface to diverge toward the extended end of the annular flange. Therefore, if lubrication oil is leaked from the shaft seal 17, the leaked oil is guided along the tapered surface and is discharged outside through the radial gap 15. Accordingly, the frictional force between the pulley 1 and the armature plate 13 is not decreased by the oil flowing into the axial gap 16 between the pulley 1 and the armature plate 13.

Since the increase of the radial thickness of the inner annular cylindrical portion 1b is realized by the use of the radial inner space of the cylindrical portion 1b, the reduction of magnetic resistance at the inner annular cylindrical portion 1b is achieved without any increase in the outer diameter of the pulley so that compact electromagnetic clutch of a greater magnetic attraction force is obtained.

Figure 6:
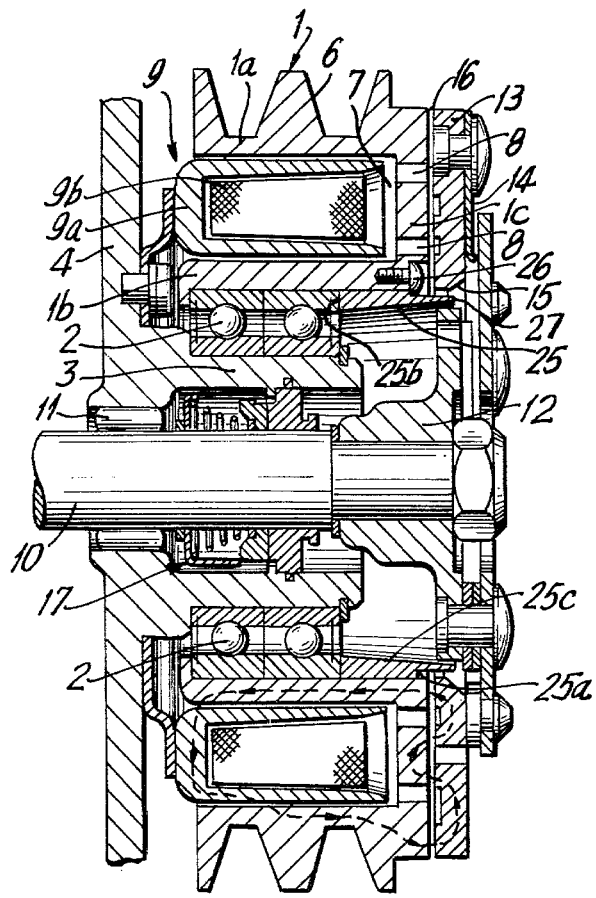
FIG. 6 is a cross-sectional view of an electromagnetic clutch according to still another embodiment of this invention.

The embodiment of FIG. 6 is a modification of the embodiment shown in FIG. 5, in that in the embodiment of FIG. 6 a magnetic ring 25 of, for example, steel is fixedly fitted into the inner annular cylindrical portion 1*b* to substantially form a smaller bore part adjacent the axial end plate portion 1*c*, which is equivalent to the smaller bore part 23 in FIG. 5.

In the embodiment of FIG. 6, the magnetic ring 25 is fixed by the engagement of the axial outer edge 25*a* thereof with heads of bolts 26 (one of which is shown) which are axially screwed into the inner annular cylindrical portion 1*b* and by the engagement of the opposite or the axial inner edge 25*b* thereof with the bearing 2. Therefore, the magnetic ring 25 serves as a stopper for the outer ring of the bearing 2.

The magnetic ring 25 is also provided with an annular flange 27 which axially outwardly extends from the radially inner and axial edges thereof. The extended end of the annular flange 27 is disposed in the radial gap 15 between the magnetic armature 13 and the hub member 12. The inner surface 25*c* of the magnetic ring 25 is formed in a tapered surface to diverge toward the extended end of the annular flange 27.

In this embodiment, the reduction of the magnetic resistance of the radial inner annular cylindrical portion 1*b* is realized, and oil flowing into the axial gap 16 between the pulley 1 and the armature plate 13 is prevented, similarly as in the embodiment shown in FIG. 5.

This invention has been described in detail in connection with preferred embodiments, but it will be understood that the embodiments are for exemplification and that this invention is not restricted to the shown embodiments. It will be understood by those skilled in the art that various modifications and other designations will be easily made within the scope of the present invention.

What is claimed is:

1. In an electromagnetic clutch comprising bearing means, a first rotatable member of magnetic material rotatably supported on said bearing means and including an outer annular cylindrical portion, an inner annular cylindrical portion, and an axial end plate portion connecting between said outer and inner annular cylindrical portions at an axial end thereof to form an annular hollow portion therebetween, an annular electromagnet stationarily disposed in said hollow portion and comprising an annular magnetic housing and an annular electromagnetic coil therein, a second rotatable shaft member, a shaft seal around said second rotatable shaft member, a hub member secured on a projected end of said second rotatable shaft member, magnetic armature means supported on and around said hub member with a radial gap therebetween so as to be capable of limited axial movement and facing said axial end plate portion with an axial gap therebetween, said armature means being attracted to the axial end plate portion when said electromagnet is energized, the improvement which comprises: a magnetic ring fixedly fitted into said inner annular cylindrical portion in an axial end adjacent to said axial end plate portion, whereby said inner annular cylindrical portion is substantially thicker at said axial end thereof than the other part thereof, said magnetic ring being provided with an annular flange axially outwardly extending from the axial end thereof into said radial gap between said magnetic armature means and said hub member, an inner surface of said magnetic ring being formed in a tapered surface to diverge toward the extended end of said annular flange, whereby oil leaked from said shaft seal is guided along said tapered surface to be discharged outside through said radial gap.

2. The improvement as claimed in claim 1, wherein an axial inner edge of said magnetic ring is in contact with said bearing rings, thereby to serve as an axial stopper for said bearing means.

3. The improvement as claimed in claim 1 or 2, wherein said magnetic ring is formed integrally with said inner annular cylindrical portion.

* * * * *

UNITED STATES PATENT AND TRADEMARK OFFICE
CERTIFICATE OF CORRECTION

PATENT NO. : 4,301,906
DATED : November 24, 1981
INVENTOR(S) : Isamu Shirai

It is certified that error appears in the above-identified patent and that said Letters Patent are hereby corrected as shown below:

Claim 2, column 6, line 33, change "rings" to -- means --.

Signed and Sealed this

Ninth Day of February 1982

[SEAL]

Attest:

GERALD J. MOSSINGHOFF

*Attesting Officer*   *Commissioner of Patents and Trademarks*